(12) United States Patent
Tokuda et al.

(10) Patent No.: US 7,653,987 B2
(45) Date of Patent: Feb. 2, 2010

(54) WIRE-HOLDING DEVICE

(75) Inventors: Shinsuke Tokuda, Saitama (JP); Toru Kamiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 11/726,672

(22) Filed: Mar. 22, 2007

(65) Prior Publication Data

US 2007/0234559 A1 Oct. 11, 2007

(30) Foreign Application Priority Data

Apr. 11, 2006 (JP) .............................. 2006-109033

(51) Int. Cl.
*B23P 19/00* (2006.01)
*B21F 3/00* (2006.01)

(52) U.S. Cl. .............................. 29/760; 29/732; 29/747; 29/748; 29/755; 140/92.1; 248/74.1

(58) Field of Classification Search .................... 29/760, 29/755, 762, 732, 747, 748; 362/250, 147; 140/92.1; 248/74.1, 71, 153, 154, 175, 218.1, 248/260; 174/44, 173; 296/142, 158, 164, 296/167
See application file for complete search history.

(56) References Cited

U.S. PATENT DOCUMENTS

| | | | | |
|---|---|---|---|---|
| 3,538,640 A * | 11/1970 | Hayes et al. | ................. | 446/454 |
| 3,872,881 A * | 3/1975 | Miller et al. | ............ | 137/355.17 |
| 3,999,784 A * | 12/1976 | Kennedy, Jr. | ................. | 285/62 |
| 4,899,965 A * | 2/1990 | Usui | .......................... | 248/68.1 |
| 5,167,065 A * | 12/1992 | Koga | ........................... | 29/824 |
| 5,455,754 A * | 10/1995 | Hoffner | ...................... | 362/250 |
| 5,694,678 A * | 12/1997 | Karasik | ....................... | 29/721 |
| 6,352,602 B1 * | 3/2002 | Ogawa | ........................ | 156/131 |
| 6,829,825 B1 * | 12/2004 | Bowman et al. | ......... | 29/894.32 |
| 2002/0153772 A1 * | 10/2002 | Bunker | ........................ | 303/186 |

FOREIGN PATENT DOCUMENTS

| | | | |
|---|---|---|---|
| JP | 11203445 | * | 7/1999 |
| JP | 2003061221 | * | 2/2003 |
| JP | 2005-104329 | | 4/2005 |
| JP | 2005-271909 | | 10/2005 |

* cited by examiner

*Primary Examiner*—Minh Trinh
*Assistant Examiner*—Tai Nguyen
(74) *Attorney, Agent, or Firm*—Carrier, Blackman & Associates, P.C.; Joseph P. Carrier; William D. Blackman

(57) ABSTRACT

A device for holding electrical wires that supply power to an in-wheel motor. A clamp for restricting movement of the electrical wires only in a longitudinal direction is provided to a front area in which the electrical wires fixed at one ends to the motor are bent at about 90°. A fixing member for fixing the rotation and longitudinal movement of the wires is provided in proximity to the power source.

10 Claims, 7 Drawing Sheets

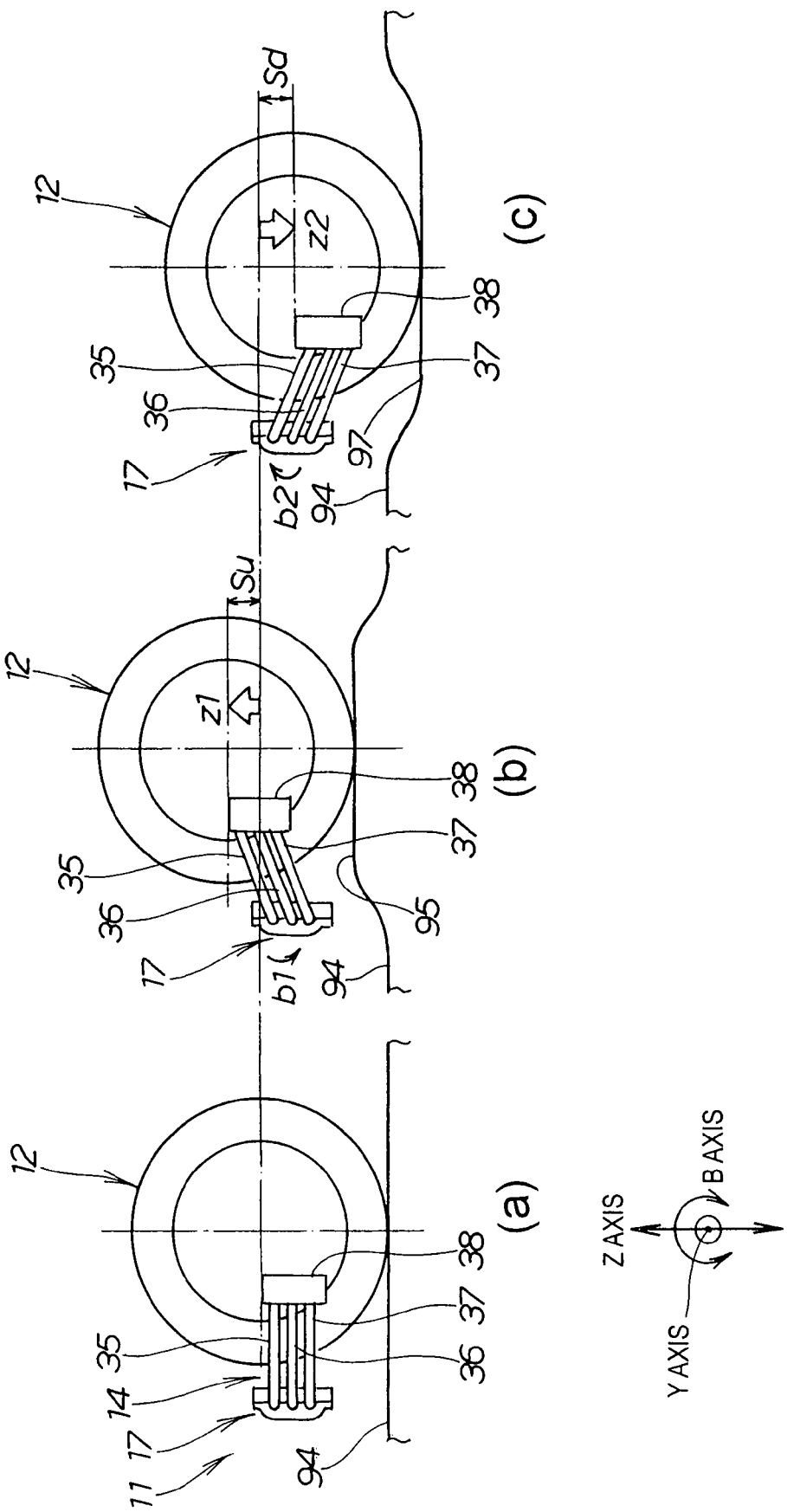

WIRE-HOLDING DEVICE

FIELD OF THE INVENTION

The present invention relates to a wire-holding device for holding wires that supply electric power to a drive motor (e.g., in-wheel motor) disposed within a wheel of a wheel assembly.

BACKGROUND OF THE INVENTION

In recent years, vehicles propelled by electric motors have undergone rapid development. For example, there are two-wheel drive and four-wheel drive vehicles that use drive motors (in-wheel motor) disposed in a wheel. In an in-wheel motor, wires for supplying electric power are laid out so as to be directly connected to the wheel, and the wires must therefore be held while allowed to follow the movement of the wheel assembly.

Thus, JP-A-2005-104329 discloses a wiring device in which the wires of an in-wheel motor are loosely held at a predetermined bending radius so as to follow the movement of the wheel assembly.

Furthermore, JP-A-2005-271909 discloses a wiring device having a swingably mounted wiring clamp for holding the wires of an in-wheel motor.

The wiring device of JP-A-2005-104329 is described in detail below with reference to FIG. 8, and the wiring device of JP-A-2005-271909 is described in detail below with reference to FIG. 9 hereof.

The wiring device 201 shown in FIG. 8 holds an electrical wire 204 that supplies electricity to an in-wheel motor 203 disposed in a wheel 202, and the electrical wire 204 is held at a predetermined bending radius and allowed to follow the steering and the vertical movement of a wheel assembly 205.

Specifically, the wiring device 201 has a body-side fixed part 206, a fixed-side guide 207, an intermediate roller 208, and a motor-side guide 209. The intermediate roller 208 is rotated via a chain 211 concurrent with the steering of the wheel assembly 205, whereby the electrical wire 204 is held at a predetermined bending radius. Furthermore, a flexing part 212 is provided between the body-side fixed part 206 and the fixed-side guide 207, whereby bending of the electrical wire 204 due to the vertical movement of the wheel assembly 205 can be reduced.

However, the wiring device 201 described above must have the body-side fixed part 206, fixed-side guide 207, intermediate roller 208, motor-side guide 209, chain 211, and other components for rotating the intermediate roller 208 in synchronization with the wheel assembly 205, resulting in a complex structure.

The structure includes many components, and the space required for accommodating those components increases. It is also necessary to provide space for the rotation of the intermediate roller 208, and it is thus difficult to reduce the size of the structure.

Another problem is the considerable slack in the flexing part 212 needed to allow the wires to follow the vertical movement of the wheel assembly 205.

In the wiring device 221 shown in FIG. 9, wires 224 to 226 for supplying power to an in-wheel motor 223 disposed inside a wheel 222 are held by a wiring clamp 227. The wiring clamp 227 swings around a kingpin 228 in accordance with the bending of the wires 224 to 226.

In the wiring device 221 described above, it is possible to reduce the bending force applied to the wires 224 to 226, but it is necessary to maintain space for the wiring clamp 227 to rotate, and the size of the device is difficult to reduce.

SUMMARY OF THE INVENTION

It is therefore an object of the present invention to provide a wire-holding device in which it is possible to reduce breakage due to repetitive bending of wires that accompanies the vertical movement of a wheel assembly, whose structure can be simplified and space reduced, and in which it is possible to reduce the amount of slack in a wire that extends between a vehicle body and an in-wheel motor.

According to the present invention, there is provided a wire-holding device for holding a wire which is connected at one end to a drive motor disposed in a wheel of a wheel assembly and supplies power to the drive motor, the wire having a part bent at generally 90°, the device comprising: a clamp for holding the wire in an area forward of the bent part such that axial movement of the wire is restricted but rotational movement of the wire is allowed; and a fixing member disposed toward the power source for restricting axial and rotational movements of the wire.

Thus, when the wheel assembly moves in the vertical direction due to the presence of a stepped portion or other irregularities in the road surface, and a twisting force is applied to the wires whose front area is bent at about 90°, the clamp does not restrict the ability of the wires to twist, and the wire can be freely twisted along the interval from the fixing member to the point at which the wire is bent at about 90°. As a result, the portion of the wire between the fixing member and the front area at which the wire is bent at about 90°, which is longer than the portion of the wire between the clamp and the point at which the wire is bent at about 90°, can be twisted, and the twisting angle per unit length of the wire is small. It is thereby possible to reduce breakage due to the repetitive bending of the wire that accompanies the vertical movement of the wheel assembly, and it is also possible to reduce damage caused by twisting.

Furthermore, the wire-holding device has the clamp and fixing member. Therefore, the wire can be held in a fixed state substantially equivalent to that provided by the prior art, the structure can be simplified, and space can be reduced.

Additionally, the clamp for allowing rotation and restricting movement in the axial direction is used in the wire-holding device, whereby it is possible to reduce the amount of slack in the wire between the vehicle body and the in-wheel motor (drive motor).

Preferably, the clamp has a bearing structure. As a result, it is possible to reduce the force necessary to restrict rotation when the wire is twisted, the breakage caused by the repetitive bending of the wire due to the vertical movement of the wheel assembly, and the damage caused by twisting.

Desirably, the clamp has a tubular cushioning member fixedly mounted at the position in which the wire is clamped, and a bearing disposed on the periphery of the tubular cushioning member. The tubular cushioning member and the wire are allowed for rotation and restricted from movement in the longitudinal direction relative to the bearing. The clamp has a simple structure.

In a preferred form, the tubular cushioning member is attached to the outer peripheral surface of the wire so that the wire is prevented from rotating and moving in the longitudinal direction.

BRIEF DESCRIPTION OF THE DRAWINGS

A preferred embodiment of the present invention will be described in detail below, by way of example only, with reference to the accompanying drawings, in which:

FIG. 6 is a schematic view showing a state in which the wires are twisted by vertical movement of the wheel assembly;

DESCRIPTION OF THE PREFERRED EMBODIMENT

Figure 1:
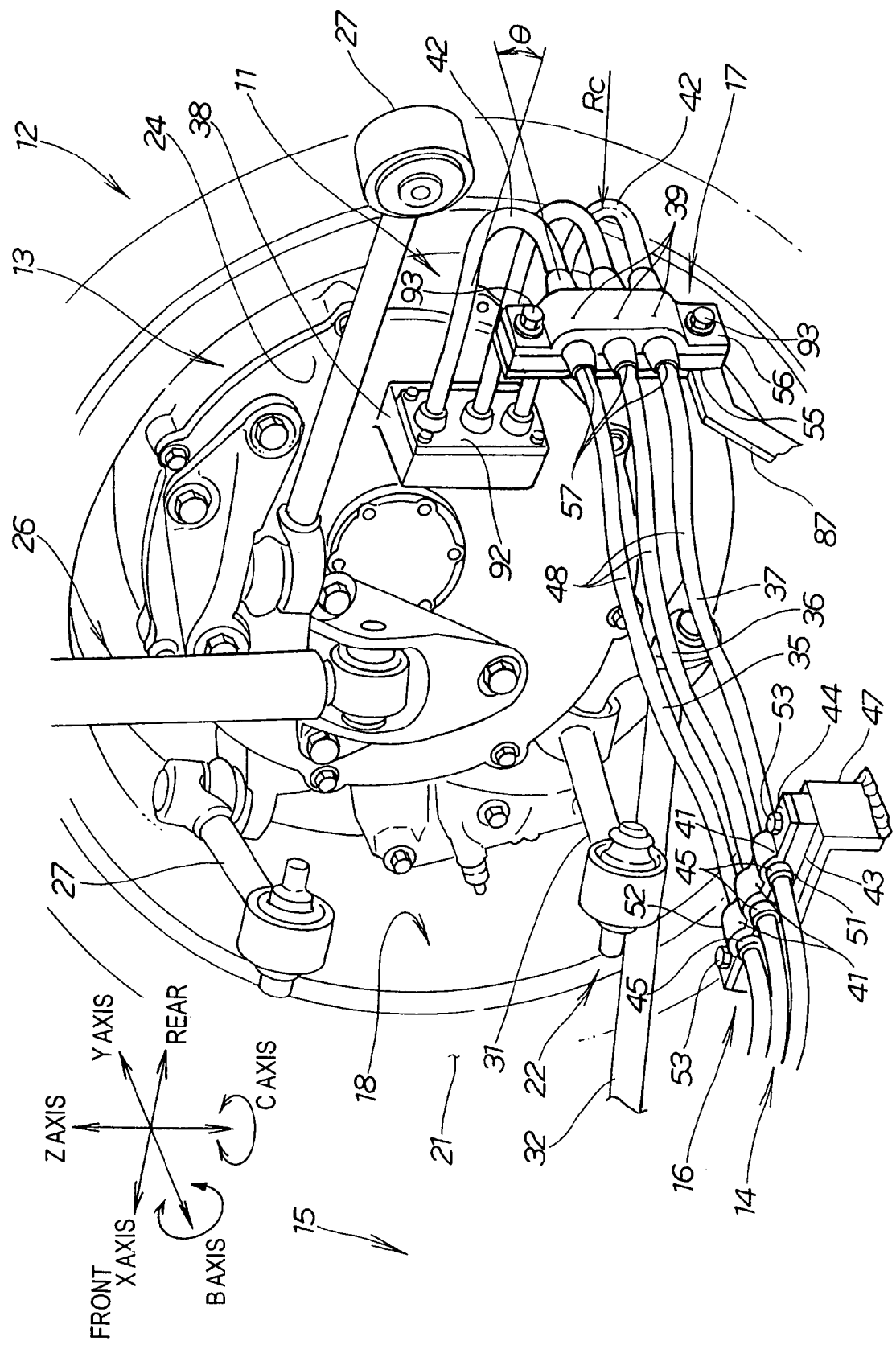
FIG. 1 is a perspective view of a wire-holding device of the present invention.

In the description of the wire-holding device of the present embodiment, the X shown in the drawings is a horizontal axis indicating linear motion, Y is an axis (width direction of the vehicle) perpendicular to X, Z is a vertical axis perpendicular to X and Y, B is an axis indicating rotational motion around the Y axis, and C is an axis indicating rotational motion around the Z axis.

Figure 2:
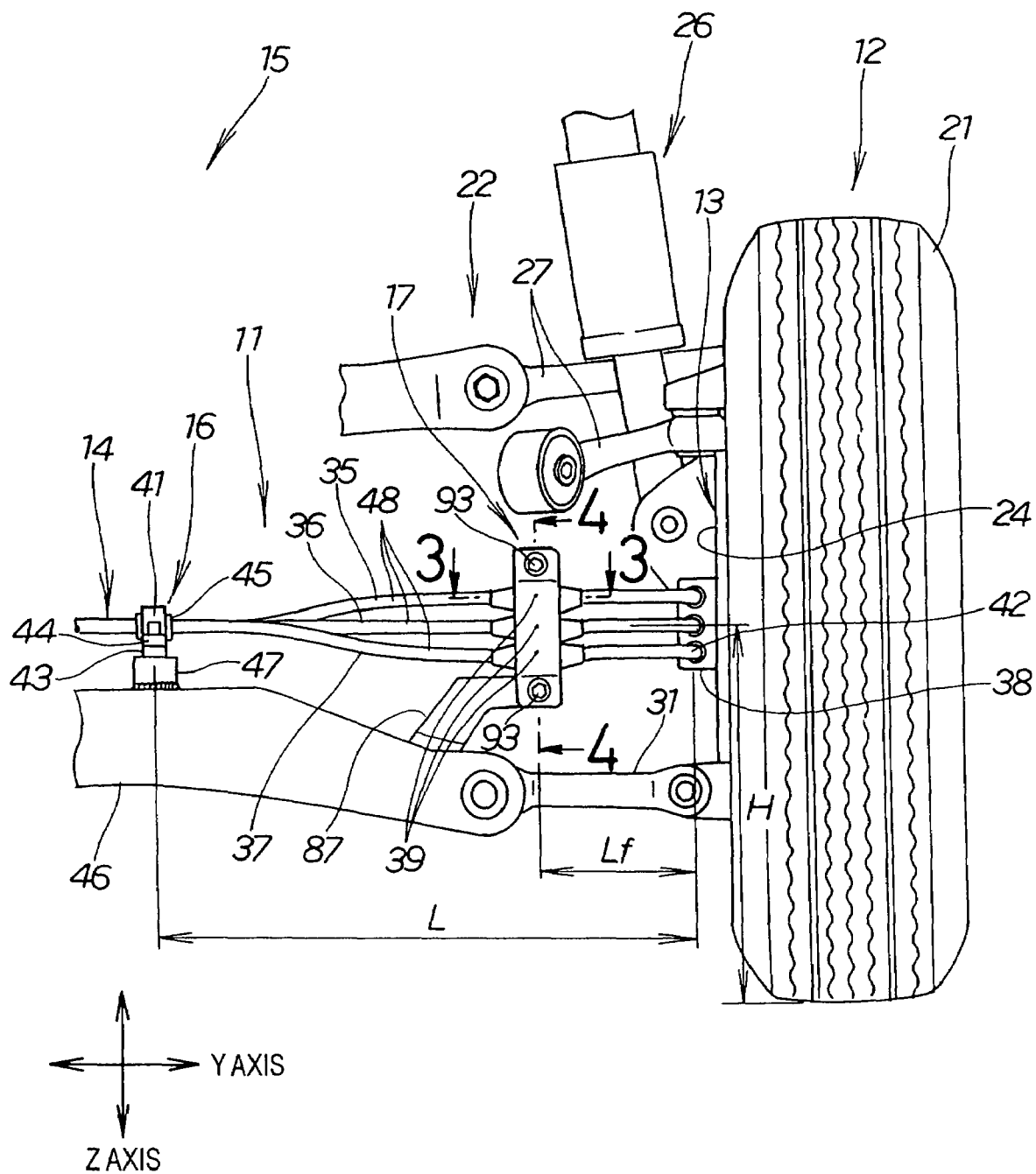
FIG. 2 is a rear view of the wire-holding device shown in FIG. 1.

In reference to FIGS. 1 and 2, a wire-holding device 11 holds wires 14 that are connected to an in-wheel motor (drive motor) 13 for driving a wheel assembly 12, and is composed of a clamp 17 and a fixing member 16 mounted on a vehicle body 15.

The wheel assembly 12 is composed of a wheel 18 as a right rear wheel attached to a hub (not shown) of the in-wheel motor 13, and a tire 21 supported on the wheel 18.

The wheel 18 is an aluminum wheel, for example, and the in-wheel motor 13 is accommodated inside the wheel 18. The numerical symbol 22 indicates a suspension device, and the in-wheel motor 13 is connected to the suspension device 22.

One end of the suspension device 22 is connected to a motor cover 24 of the in-wheel motor 13, and the other end has a damper 26 connected to the vehicle body 15, as well as upper rods 27, 27 and lower rods 31, 31, 32. The damper 26 expands and contracts when an impact is applied to the wheel assembly 12 from the surface of the road, whereby the wheel assembly 12 moves vertically (in the Z axis direction) and the impact is absorbed.

The wheel assembly 12 moves vertically in the Z axis direction, but a steering device for steering the wheel assembly 12 (in the C axis direction) is not disposed in proximity to the suspension device 22. Therefore, the wheel assembly 12 is not steered (in the C axis direction).

Power is supplied to the in-wheel motor 13 from the vehicle body 15 via the wire 14, whereby the wheel assembly 12 is driven by the motor.

The wire 14 is composed of a first wire 35, a second wire 36, and a third wire 37 for supplying the in-wheel motor 13 with power from a power source (battery) or a generator mounted on the vehicle frame 15. The first through third wires 35 to 37 are connected to a lead-in box 38 disposed on the motor cover 24. The supporting position 39 of the first through third wires 35 to 37 in the interval up to the lead-in box 38 is secured by the clamp 17, and the fixed position 41 of the first through third wires 35 to 37 is secured by the fixing member 16. H indicates the wiring height.

The supporting position 39 is placed at length Lf from a bent part 42 of the wires 14.

The fixed position 41 is placed at length L from the bent part 42 of the wires 14, and L is greater than Lf. L is the length of a transfer part 48, which corresponds to the part of the wires 14 that extends from the fixed position 41 to the lead-in box 38.

The bent part 42 of the wires 16 is bent at a bending angle □ in proximity to the tire 21 of the wheel assembly 12. The bending angle □ is about 90°.

The fixing member 16 is generally mounted at a position that is not displaced from the vehicle body, and is fixed to a suspension-fixing frame 46 in the present embodiment. The first through third wires 35 to 37 are fixed to the suspension-fixing frame 46 by the fixing member 16. The fixing member 16 has a first gripping member 43, a second gripping member 44 disposed on top of the first gripping member 43, and protective members 45 positioned between the first and second gripping members 43, 44. The protective members 45 cover the outer periphery of the wires at the fixed position 41 of the wires to protect these wires. Each of the protective members 45 has an opening extending in the longitudinal direction.

The first through third wires 35 to 37 are gripped by the first and second gripping members 43, 44, whereby the fixed position 41 of the first through third wires 35 to 37 does not move in the longitudinal direction (Y axis direction) of the first through third wires 35 to 37, and also does not rotate in the twisting direction (B axis direction) of the first through third wires 35 to 37.

In the present embodiment, an example is depicted in which the fixing member 16 is mounted on the suspension-fixing frame 46. However, depending on the structure of the suspension device 22 or the structure of the vehicle body 15, the fixing member may be directly mounted on the vehicle body 15 without the interposed suspension device 22.

The following is a simple explanation of an example in which the wires are fixed to the fixing member 16.

First, the openings in the protective members 45 are formed at the fixing positions 41 of the first through third wires 35 to 37, and the protective members 45 are placed over the wires.

Next, the first gripping member 43 is set on the bracket 47 that is fixedly welded to the suspension-fixing frame 46, and the protective members 45 are gripped between a first concavity 51 of the first gripping member 43 and a second concavity 52 of the second gripping member 44.

Next, a bolt hole of the second gripping member 44, a bolt hole of the first gripping member 43, and an internally threaded part of the bracket 47 are aligned, and bolts 53, 53 are threaded into the internally threaded part.

When the bolts 53, 53 are tightened, the protective members 45 are tightened by the first and second gripping members 43, 44, and the wires 35 to 37 are held at the fixed position 41 and are fixed to the bracket 47. The bracket 47 is welded and fixed to the suspension-fixing frame, and is therefore a part of the vehicle body 15. As a result, the wires 14 are fixed to the vehicle body 15.

The clamp 17 holds the first through third wires 35 to 37 between the fixing member 16 and the in-wheel motor 13, and is itself fixed to the suspension-fixing frame 46. The clamp 17 rotatably (in the B axis direction) holds the first through third wires 35 to 37, and holds the first through third wires 35 to 37 so as to restrict movement in the longitudinal direction (Y axis direction).

Figure 3:
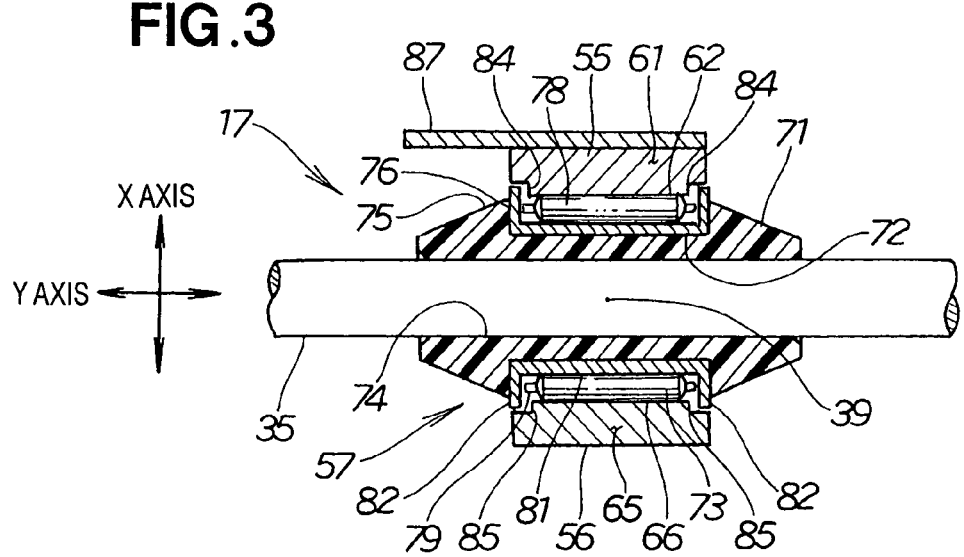
FIG. 3 is a cross-sectional view taken along line 3-3 of FIG. 2.
Figure 4:
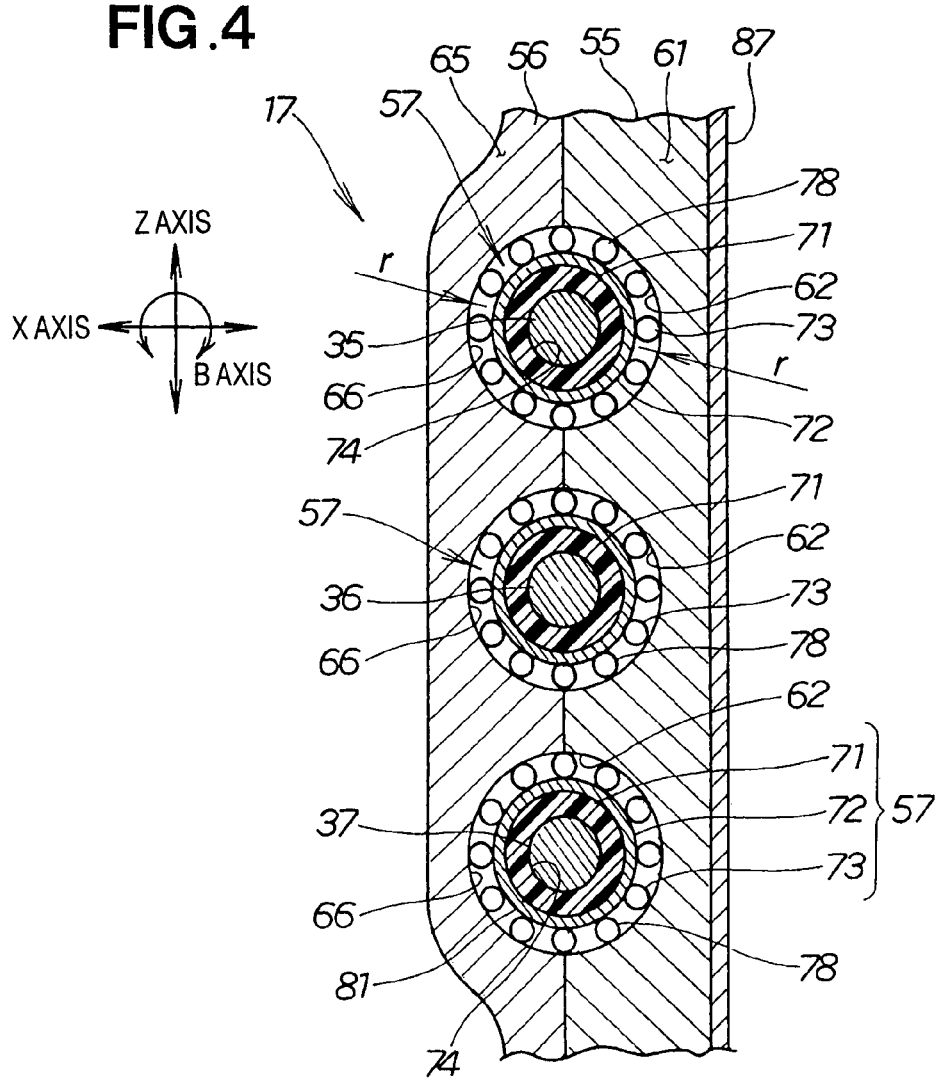
FIG. 4 is a cross-sectional view taken along line 4-4 of FIG. 2.
Figure 5:
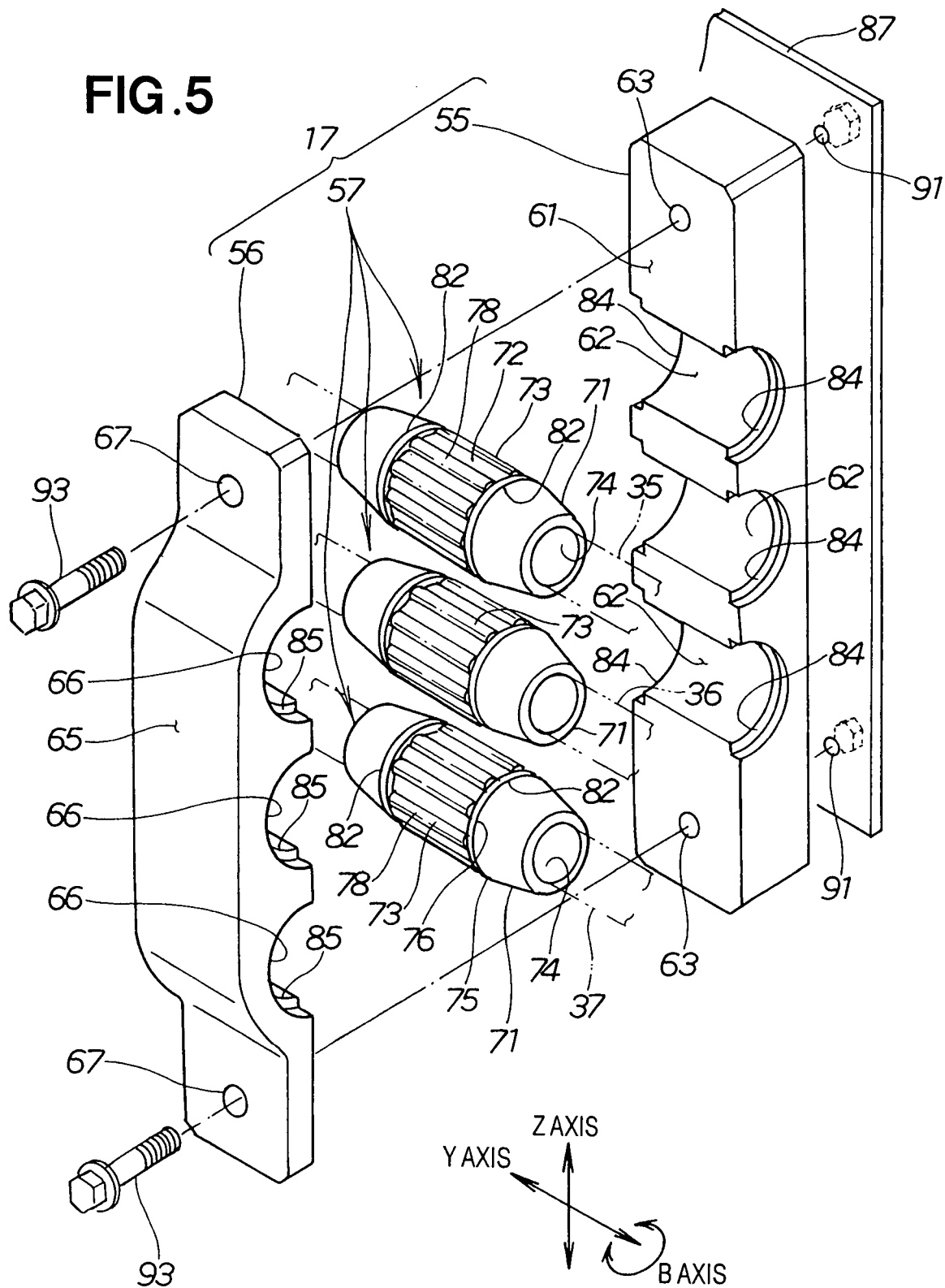
FIG. 5 is an exploded perspective view of the clamp shown in FIG. 1.

As shown in FIGS. 3 to 5, the clamp 17 is composed of a base member 55 that is fixed to the suspension-fixing frame 46, a hold-down member 56 superposed on the base member 55, and wire rotation permitting members 57 supported by these members 55, 56.

The base member 55 has three first divided concavities 62 formed in a base main body 61. The first divided concavities 62 have a semicircular shape of radius r. Mounting holes 63, 63 are formed in the top and bottom ends of the base main body 61.

The hold-down member 56 has three second divided concavities 66 formed in a holding main body 65. The second divided concavities 66 face the first concavities 62, and have a semicircular shape of radius r. Mounting holes 67, 67 are formed in the top and bottom ends of the holding main body 65.

The wire rotation permitting members 57 individually and rotatably (in the B axis direction) support the first through third wires 35 to 37.

The following is a description of an example of the first wire 35 shown in FIG. 3. Each of the wire rotation permitting members 57 has a tubular cushioning member 71 mounted at the supporting position 39 of the first wire 35, a guide member 72 fitted over the outer periphery of the tubular cushioning member 71, and a wire receiving member 73 mounted on the outer surface of the guide member 72.

In the tubular cushioning member 71, the first wire 35 is attached to the inner peripheral surface 74 using an adhesive or the like so that the first wire 35 does not move in the longitudinal direction and does not rotate. The first wire 35 can be more reliably fixed by also tightening the outer peripheral surface 75 using a band or the like. The tubular cushioning member 71 has a peripheral concavity 76 formed in the outer peripheral surface 75 thereof. The guide member 72 is fitted into the peripheral concavity 76. In the example shown in the drawings, the inner periphery 74 of the tubular cushioning member 71 is smooth, but grooves, concavities, or convexities may also be formed. In such cases, the connectivity of the first wire 35 is further enhanced.

The wire receiving member 73 has a bearing structure. The example shown in the drawings illustrates a roller bearing that has needle roller bearings in which a plurality of rollers 78 is disposed. However, sliding bearings may also be used in the present invention. The rollers 78 are held by a retainer 79.

As shown best in FIG. 3, the guide member 72 is substantially spool-shaped including an upper portion and a lower portion each having a cross-sectional U shape, and including a cylindrical track part 81 for guiding the needle roller bearings 78, and side walls 82, 82 which are integrally formed with, and extend radially outwardly from the outer edges of the track part 81. The outer portions of the side walls 82 fit into the grooves defined by the respective stoppers 84, 85 of the base member and the base member 55 and the hold-down member 56, to restrict axial movement of the guide member 72 in the clamp 17. The needle roller bearings 78 are in contact with the base member 55 and the hold-down member 56.

Stoppers 84, 84 that are in contact with the side walls 82, 82 of the guide member 72 are formed in the first divided track parts 62 of the base member 55. Stoppers 85, 85 that are in contact with the side walls 82, 82 of the guide member 72 are formed in the second divided track parts 66 of the hold-down member 56.

A wire bracket 87 is mounted on the suspension-fixing frame 46 (FIG. 2). Internally threaded parts 91, 91 are formed in the wire bracket 87 so as to be concentric with the mounting holes 63, 63 formed in the base member 55 and the mounting holes 67, 67 formed in the hold-down member 56.

The retainer 79 can also be omitted, and the wire receiving member (needle roller bearing) 73 can be composed of a plurality of rollers 78 accommodated between the side walls 82, 82 of the guide member 72.

The wire rotation permitting members 57 shown in the drawings illustrate an example in which needle roller bearings 78 are used. However, the needle roller bearings 78 are only one example, and bearings other than needle roller bearings may be used. In other words, it is possible to use any member that reduces the friction coefficient between the base member 55 and the wire rotation permitting members 57, and between the hold-down member 56 and the wire rotation permitting members 57. For example, a tube that uses a resin or metal having a low friction coefficient may be used.

A surface treatment may also be performed on the base member 55 and the hold-down member 56 to reduce the friction coefficient thereof instead of using the needle roller bearing 78 or a tube.

The shape of the first divided track part 62 and the second divided track part 66 can be altered according to the configuration of the wire rotation permitting members 57 (including the wire receiving member 73).

The following is a simple description of a method for mounting the clamp 17, based on FIGS. 1 through 5.

First, the wire rotation permitting members 57 are fixed at the supporting positions 39 of the first through third wires 35 to 37. The tubular cushioning members 71 fitted on the wires in advance are then held ready in proximity to the supporting positions 39, an adhesive is applied to the supporting positions 39, and the tubular cushioning members 71 are bonded by being moved to the supporting positions 39.

Next, the first through third wires 35 to 37 are connected inside the lead-in box 38, and a lid 92 (FIG. 1) of the lead-in box 38 is closed.

Next, the three wire rotation permitting members 57 are sandwiched between the base member 55 and the hold-down member 56. Specifically, the wire rotation permitting members 57 are sandwiched between the first divided track parts 62 and the second divided track parts 66.

The base member 55 is then held against the wire bracket 87; the internally threaded parts 91, 91 of the wiring bracket 87 are aligned with the mounting holes 63, 67; and the bolts 93, 93 are threaded into the internally threaded parts 91, 91.

The bent parts 42 of the first through third wires 35 to 37 are then bent at about 90° in proximity to the tire 21, as shown in FIG. 1. At the same time, the bent parts 42 are bent at a predetermined bending radius Rc.

The first through third wires 35 to 37 are laid out in a substantially linear fashion from the bent part 42 to the fixing member 16, and are laid out in a substantially linear fashion from the bent part 42 to the in-wheel motor 13.

In the example shown in the drawings, the first through third wires 35, 36, and 37 are bent at about 90°. However, in the present invention, the bending angle can be within a range of 80° to 110°.

The first through third wires 35 to 37 that span the length L are laid out so as to be substantially horizontal and have essentially no slack. Similarly, the first through third wires 35 to 37 are laid out so as to be substantially horizontal from the bent part 42 to the lead-in box 38 and have essentially no slack.

The steps for mounting the clamp 17 are thereby completed simultaneously with the steps for mounting the wire rotation permitting members 57 (including the needle roller bearing 73) in the base member 55 and the hold-down member 56.

Thus, the assembly of the wire-holding device 11 is completed by assembling the clamp 17 and the fixing member 16.

The timing at which the first through third wires 35 to 37 are connected in the lead-in box 38 is arbitrary.

Figure 7A:
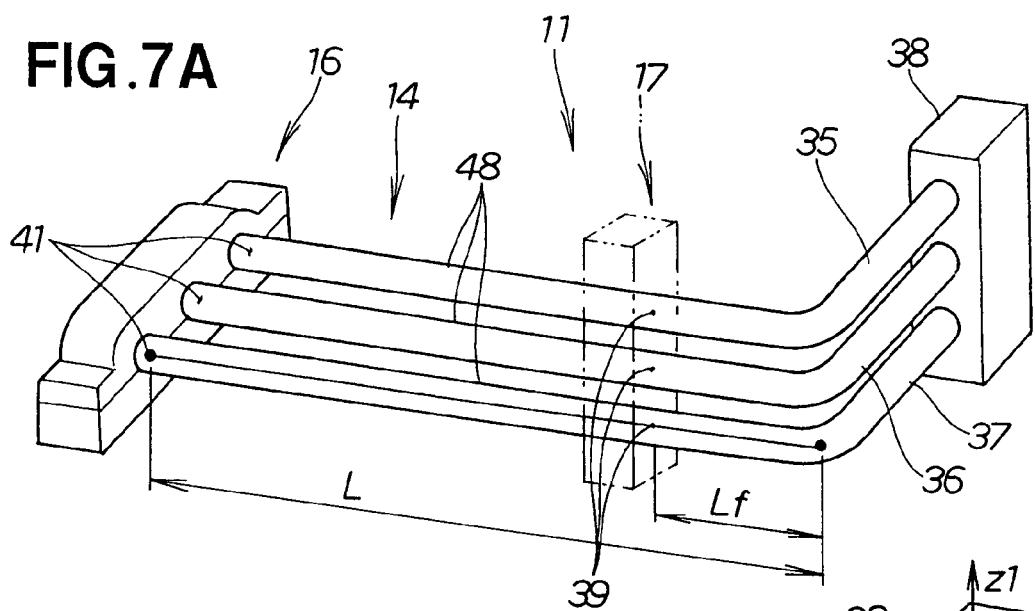
FIGS. 7A to 7C are views showing the details of a state in which the wires are twisted.
Figure 7B:
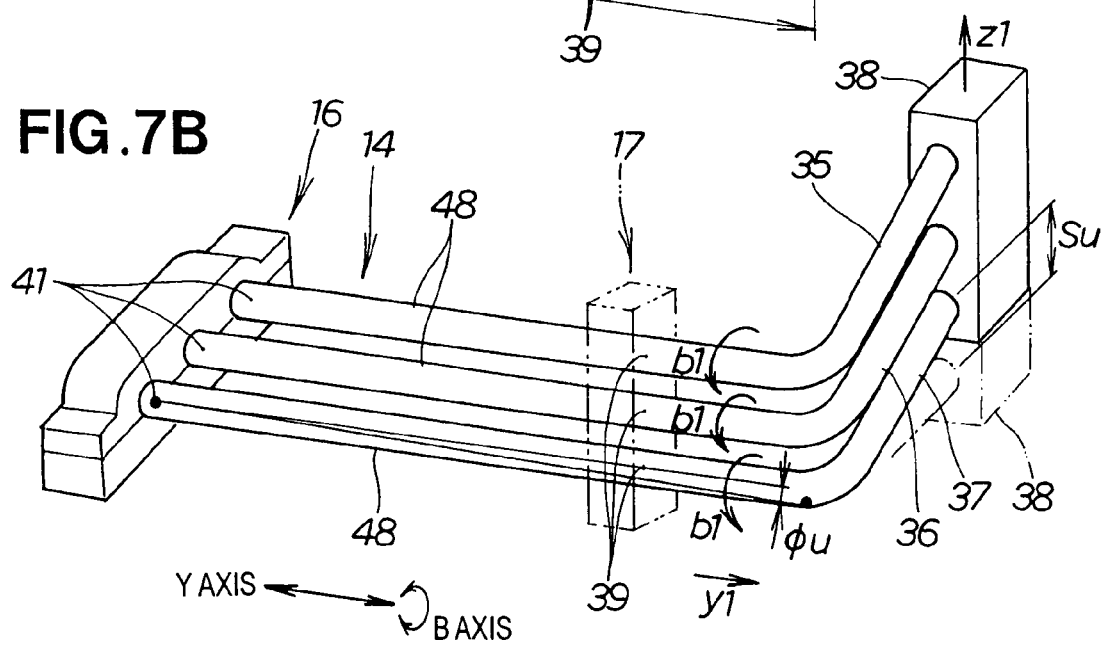
Figure 7C:
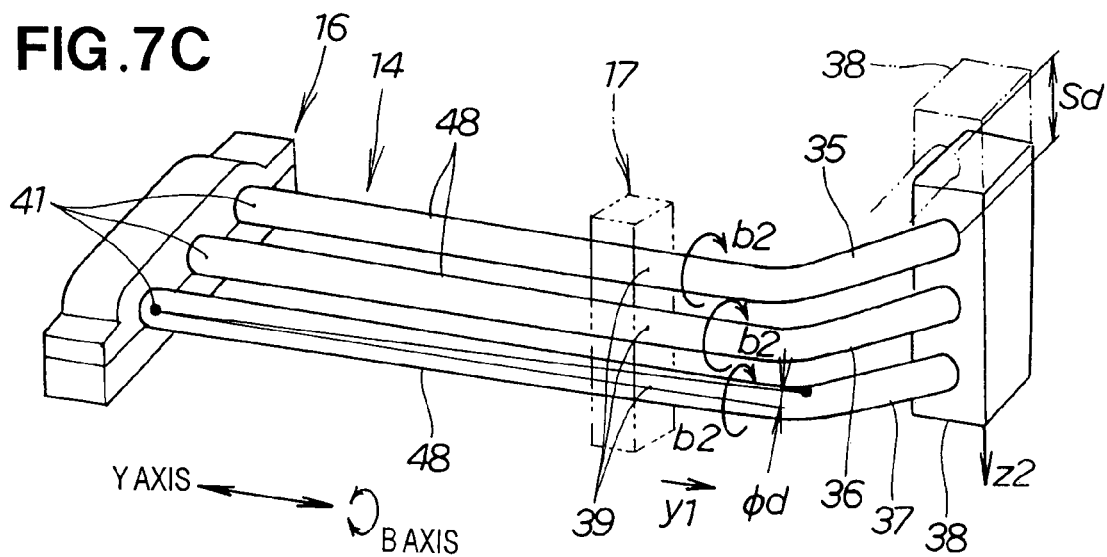
Figure 8:
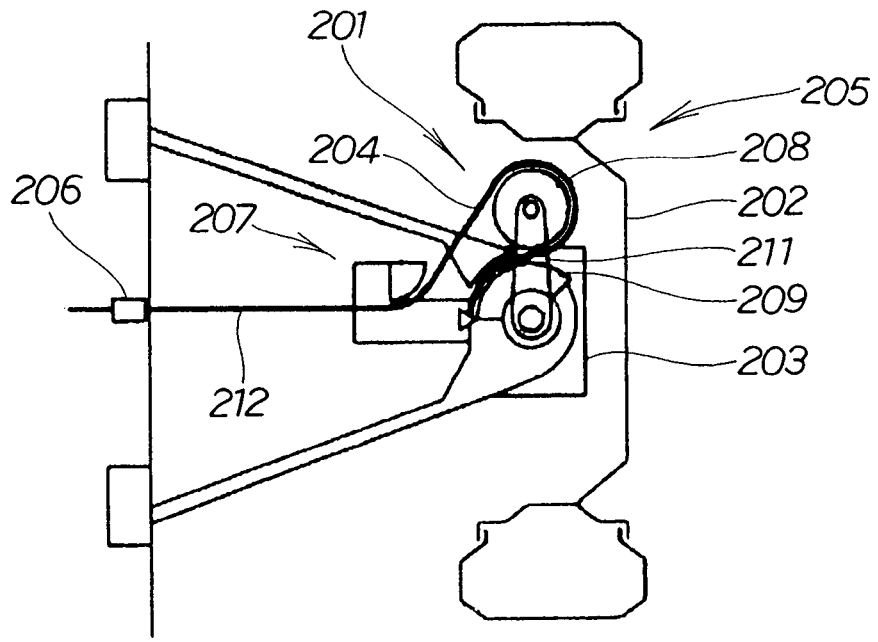
FIG. 8 is a schematic view showing a first conventional wiring device.
Figure 9:
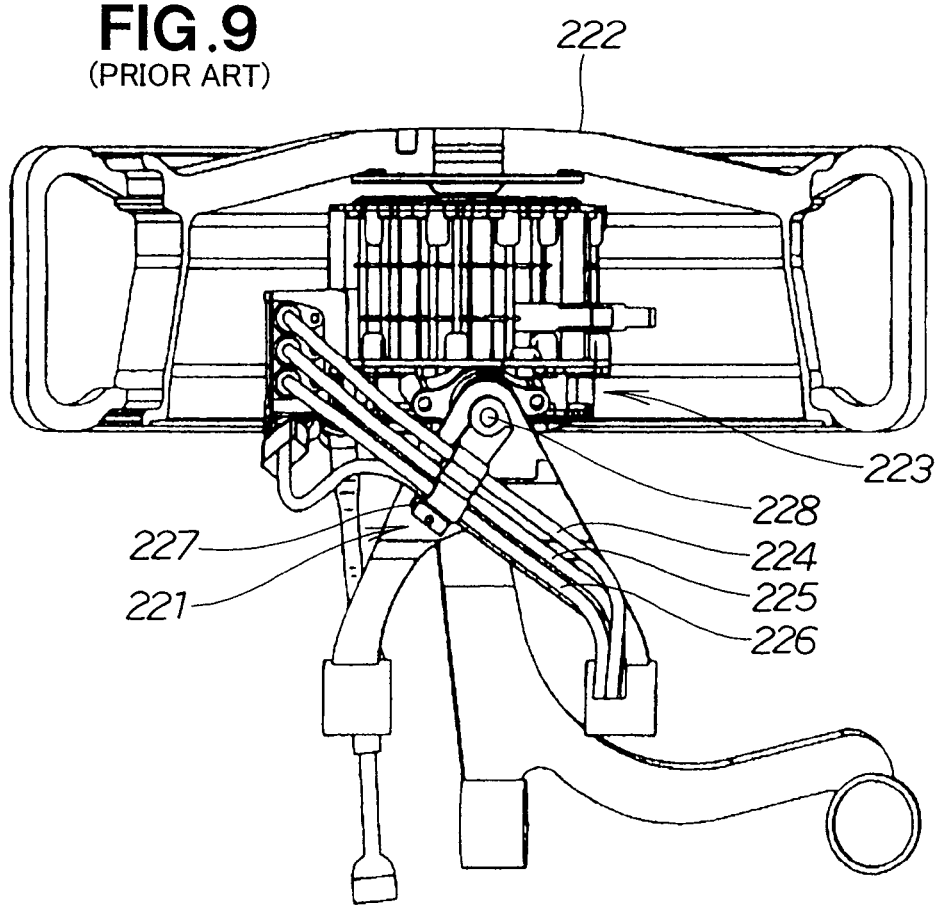
FIG. 9 is a view showing a second conventional wiring device.

The following is a description of the operation of the wire-holding device of the present invention, made with reference to FIGS. 6 and 7A to 7C. FIG. 6 shows an outline of reducing the twisting in the wires 35 to 57 by the wire-holding device 11 of the present invention, wherein FIG. 6(a) shows a state in which the wheel assembly 12 is not moving vertically (rotating); FIG. 6(b) shows a state in which the wheel assembly 12 is raised; and FIG. 6(c) shows a state in which the wheel assembly 12 is lowered. FIGS. 7A to 7C show a state in which force is applied to the wires 35 to 37 in FIGS. 6(a) to 6(c).

The wheel assembly 12 does not move vertically in cases in which the road surface 94 is smooth as shown in FIG. 6(a) and FIG. 7A. There is therefore no twisting in the transfer part 48 of part of the wires 14 disposed within the range of length L of the first through third wires 35 to 37.

When the road surface 94 has a convex stepped portion 95, as shown in FIG. 6(b) and FIG. 7B, the wheel assembly 12 protrudes upward by a distance Su due to the presence of the convex stepped portion 95, as indicated by the arrow z1. Therefore, twisting occurs as indicated by the arrow b1 in the portion of the transfer part 48 disposed within the range of length L of the first through third wires 35 to 37 oriented parallel to the Y axis direction.

When twisting force is applied to the transfer part 48, the wire receiving member (needle roller bearing) 73 of the clamp 17 rotates in the direction indicated by the arrow b1. Therefore, the origin of the twisting is the fixed position 41, and the twisting angle □ u having length L is reduced. Therefore, breakage due to the repetitive bending of the first through third wires 35 to 37 that accompanies the upward motion of the wheel assembly 12 can be prevented, and the twisting can be reduced.

Tensile force is generated in the direction of arrow y1 at the same time that the twisting force is applied, but the side walls 85, 85 of the wire rotation permitting members 57 press against the stoppers 84, 84 of the base member 55 and stoppers 85, 85 of the hold-down member 56, and the first through third wires 35 to 37 can therefore be prevented from moving in the direction of the central axis line (Y axis direction).

Conversely, when the road surface 94 has a concave stepped portion 97, as shown in FIG. 6(c) and FIG. 7C, the wheel assembly 12 is lowered by a distance Sd due to the presence of the concave stepped portion 97, as indicated by the arrow z2. Therefore, twisting occurs as indicated by the arrow b2 in a portion of the transfer part 48 disposed within the range of the length L of the first through third wires 35 to 37 oriented parallel to the Y axis direction.

When twisting force is applied to the transfer part 48, the wire receiving member (needle roller bearing) 73 of the clamp 17 rotates in the direction indicated by the arrow b2. Therefore, the origin of the twisting is the fixed position 41, and the twisting angle □ d having length L is reduced. Accordingly, breakage due to the repetitive bending of the first through third wires 35 to 37 that accompanies the downward motion of the wheel assembly 12 can be prevented, and the twisting can be reduced.

When tensile force is applied in the direction of arrow y1 at the same time as the twisting force is applied, the side walls 85, 85 of the wire rotation permitting members 57 press against the stoppers 84, 84 of the base member 55 and the stoppers 85, 85 of the hold-down member 56, and the first through third wires 35 to 37 can therefore be prevented from moving in the direction of the central axis line (Y axis direction).

The wire-holding device 11 is composed of the clamp 17 and the fixing member 16 mounted on the vehicle body 15. Therefore, wires can be held in a fixed state substantially equivalent to that provided by the prior art, the structure can be simplified, and space can be reduced.

In the wire-holding device 11, there is no need to form extra slack in the first through third wires 35 to 37 between the fixing member 16 and the clamp 17, and it is possible to reduce the amount of slack in the wires 14 between the vehicle body 15 and the in-wheel motor 13.

There is also no need to provide extra slack in the first through third wires 35 to 37 between the clamp 17 and the drive motor, and it is possible to reduce the amount of slack in the wires 14 between the vehicle body 15 and the in-wheel motor 13.

In the embodiments, the wire-holding device of the present invention was used to hold wires, but it is also possible to use the device to hold lines other than wires.

The wire-holding device of the present invention was used for wiring between a wheel assembly and an automobile body, but it is also possible to use the device for laying wires other than between a wheel assembly and a vehicle body. For example, it is possible to use the device for laying wires between a fixed part corresponding to the vehicle body and a moving part corresponding to the wheel assembly.

The bearing structure also includes a sliding bearing or the like.

Obviously various minor changes and modifications of the present invention are possible in light of the above teaching. It is therefore to be understood that within the scope of the appended claims the invention may be practiced otherwise than as specifically described.

What is claimed is:

1. A wire-holding system for a vehicle having a wheel, a drive motor disposed in said wheel, and an electrical wire for supplying electrical power to the drive motor, the electrical wire having a bent part; said wire-holding system comprising:
    a clamp for holding the wire in an area forward of the bent part, said clamp comprising at least one wire rotation-permitting member which is configured such that axial movement of the wire is restricted but rotational movement of the electrical wire about an axial line thereof is allowed; and
    a fixing member adapted to be mounted to a vehicle body for restricting axial and rotational movements of the wire, wherein the clamp is disposed between the drive motor and the fixing member.

2. The wire-holding system of claim 1, wherein the clamp has a base member and a hold-down member superposed on the base member.

3. The wire-holding system of claim 2, wherein the base member has three first concavities formed therein and having a semi-circular shape.

4. The wire-holding system of claim 3, wherein the hold-down member has three second concavities that face the first concavities and have a semi-circular shape.

5. The wire-holding system of claim 4, wherein respective inner portions of the first and second concavities have bearing surfaces therein.

6. The wire-holding system of claim 5, wherein a tubular cushioning member is positioned on the wire to fit in one of the three first and second concavities such that the bearing surface of the concavities contacts a bearing surface on the outer portion of the tubular cushioning member.

7. The wire-holding system of claim 1, wherein the clamp has a tubular cushioning member fixedly mounted at a clamping position of the wire, and a bearing disposed on an outer periphery of the tubular cushioning member, so that the tubular cushioning member and the wire together are allowed to rotate but restricted from moving longitudinally relative to the bearing.

8. The wire-holding system of claim 7, wherein the tubular cushioning member is attached to an outer peripheral surface of the wire so that the wire is prevented from moving in a longitudinal direction.

9. The wire-holding system of claim 1, wherein the electrical wire comprises a plurality of wire members which are arranged parallel vertically of the vehicle body at a position where the wire members are held by the clamp and parallel longitudinally of the vehicle body at a position where the wire members are fixed by the fixing member.

10. A wire-holding system for a vehicle having a wheel, a drive motor disposed in said wheel, and an electrical wire for supplying electrical power to the drive motor, said wire-holding system comprising a clamp for holding the wire in position such that axial movement of the wire is restricted but rotational movement of the electrical wire about an axial line thereof is allowed, the clamp comprising:

a rotation-permitting structure which is configured to allow rotational movement of the wire therein while restricting axial movement thereof;

a base member which is fixedly attached to a portion of the vehicle frame, the base member having at least one concavity formed therein; and a hold-down member which is removably attachable to the base member to hold the wire therebetween while permitting rotational movement of the wire in response to reciprocal movement of said wheel, the hold-down member having at least one concavity formed therein which is alignable with the concavity of the base member; and a fixing member adapted to be mounted to a vehicle body for restricting axial and rotational movements of the wire, the fixing member comprising:

a first gripping member which is fixedly attached to a portion of the vehicle frame, the first gripping member having at least one concavity formed therein; and a second gripping member which is removably attachable to the first gripping member to clamp the wire therebetween, the second gripping member having at least one concavity formed therein which is alignable with the concavity of the first gripping member;

wherein the base member and the hold-down member each have an arcuate stopper groove formed in an edge portion thereof on each side of the concavity formed therein;

and wherein the rotation-permitting structure comprises:

a tubular cushioning member having a peripheral concavity formed in an outer peripheral surface thereof;

a substantially spool-shaped guide member which fits into the peripheral concavity of the tubular cushioning member, the guide member having side walls which are configured to fit into the stopper grooves of the clamp member; and a bearing which is disposed outside of the guide member between the side walls thereof.

* * * * *